United States Patent [19]

Boretos et al.

[11] 4,339,295

[45] Jul. 13, 1982

[54] HYDROGEL ADHESIVES AND SANDWICHES OR LAMINATES USING MICROWAVE ENERGY

[75] Inventors: John W. Boretos, Rockville, Md.; Norio Iriguchi, Fuji, Japan

[73] Assignee: The United States of America as represented by the Secretary of the Department of Health & Human Services, Washington, D.C.

[21] Appl. No.: 161,823

[22] Filed: Jun. 23, 1980

Related U.S. Application Data

[63] Continuation of Ser. No. 971,550, Dec. 20, 1978, abandoned.

[51] Int. Cl.³ ............................................... B29C 19/02
[52] U.S. Cl. ............................. 156/275.7; 128/349 B; 156/155; 156/285; 156/331.4; 156/331.7; 156/344; 156/382; 156/379.6; 204/159.19; 219/10.53; 427/45.1; 428/423.1
[58] Field of Search ................ 156/272, 344, 83, 380, 156/155, 382, 331, 285, 497, 331.04, 331.7; 204/159.19; 428/423.1; 528/73; 252/316; 219/10.53; 427/45.1; 128/349 B; 260/29.2 TN

[56] References Cited

U.S. PATENT DOCUMENTS

| | | | |
|---|---|---|---|
| Re. 25,164 | 5/1962 | Cline | 156/497 |
| 3,491,050 | 1/1970 | Keberle et al. | 156/331 |
| 3,544,668 | 12/1970 | Jereniuk | 156/155 |
| 3,551,199 | 12/1970 | Forster | 427/45.1 |
| 3,679,504 | 7/1972 | Wichterle | 156/83 |
| 4,026,296 | 5/1977 | Stoy et al. | 128/349 B |
| 4,083,901 | 4/1978 | Schonfeld et al. | 528/73 |
| 4,118,354 | 10/1978 | Harafa et al. | 260/29.2 TN |

OTHER PUBLICATIONS

Ratner et al., "Synthetic Hydrogels for Biomedical Applications," *Hydrogels for Medical and Related Applications,* ACS Symposium Series 31, ed. J. Andrase 1975, pp. 1-36.

*Primary Examiner*—John J. Gallagher
*Attorney, Agent, or Firm*—John S. Roberts, Jr.

[57] ABSTRACT

A method of bonding a material to a substrate utilizing a hydrogel adhesive and a source of microwave energy of at least 100 MHz through a waveguide. The bonding may be temporary and frangible by water or may be permanent where it is achieved in a pressure vessel.

2 Claims, 1 Drawing Figure

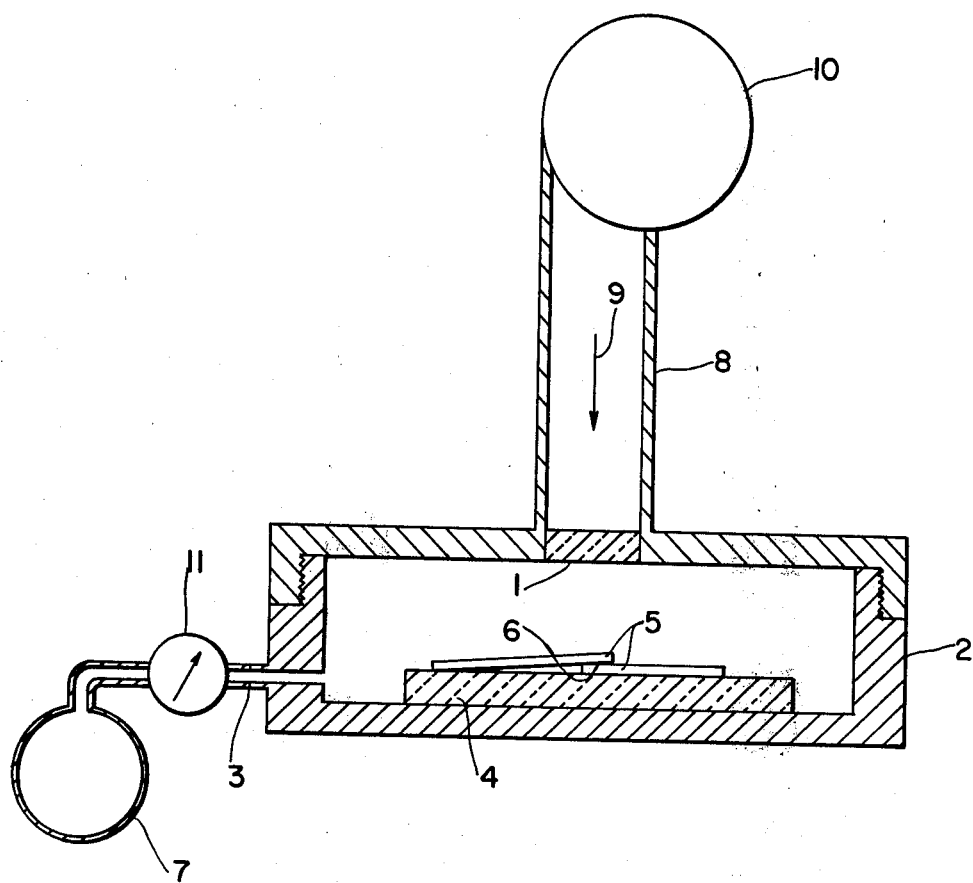

HYDROGEL ADHESIVES AND SANDWICHES OR LAMINATES USING MICROWAVE ENERGY

This is a continuation of application Ser. No. 971,550, filed Dec. 20, 1978, now abandoned.

This invention relates to a method of bonding a material to a substrate utilizing a hydrogel adhesive and a source of microwave energy of at least 100 MHz through a waveguide. The bonding may be temporary and frangible by water or may be permanent where it is achieved in a pressure vessel.

The present invention engenders the utilization of hydrogels in the formation of laminates or sandwiches preferably of biocompatible materials with medical usage. Hydrogels are a broad class of polymers that can be produced from varying types of monomers; for example, neutrally charged, acidic or anionic, and basic or cationic, or crosslinked types. Hydrogels are basically three-dimensional networks of hydrophilic polymers that are covalently or ionically crosslinked. As such, they interact with aqueous solutions by swelling to some equilibrium value, usually 10-90 weight percent.

In a recent professional article entitled "Synthetic Hydrogels for Biomedical Applications" by Ratner and Hoffman, pages 1-36, *Hydrogels for Medical and Related Applications*, ACS Symposium Series 31, ed. Joseph D. Andrade, 1976, American Chemical Society, the authors define synthetic hydrogels are polymeric materials which exhibit the ability to swell in water and retain a significant fraction of water within a structure but which will not dissolve in water. Excluded from this definition are inorganic hydrogels, such as alumina and silica varieties. The authors then name six classes of hydrogel materials, which are also useful here, as follows: poly(hydroxyalkyl methacrylates); poly(acrylamide), poly(methacrylamide) and derivatives; poly(N-vinyl-2-pyrrolidone); anionic and cationic hydrogels; polyelectrolyte complexes; and poly(vinyl alcohol). The authors also speak of these classes of polymers as imbibing water within the hydrogel. Additionally, specially preferred polymers for hydrogels are poly(N-vinyl-2-pyrrolidone/polyurethane interpolymers and a polyurethane from a polyglycol and an isocyanate.

In the utilization of microwave energy, a waveguide is preferred and microwaves in the form of a propagating electromagnetic traveling wave are conducted through the waveguide to the work product. In Canada and the United States DOT and FCC require that, for industrial microwave applications, frequencies of 915 MHz or 2450 MHz must be employed. In other countries frequencies as low as 100 MHz can be employed and as a practical matter the upper frequency limit is not critical and 10,000 MHz is a reasonable upper limit, although at this frequency the penetration of the microwave energy in the work product is quite restricted.

In the utilization of microwaves with hydrogels, several parameters are important in ascertaining, for example, whether the bonding be temporary or permanent. Such variables (1) the type of hydrogel coating applied to the substrate to be bonded, which varies because some hydrogels absorb more water than others; (2) the intensity of the microwave energy applied to the hydrogel interface and the variations in MHz have been described above; (3) the use of a pressure vessel to increase the temperature at the bond line. This is important in the use of pressure increases temperature and works toward a permanent bond which is not frangible by added water. The use of pressure is a convenient method of producing a permanent bond where other parameters are unchanged. It is further noted that the amount of water which the polymer is capable of absorbing is depending to a large extent on the basic polymer and the degree of crosslinking and the amount of hydrogel present, which varies from a thickness of several microns to several thousandths of an inch or more.

PRIOR ART STATEMENT

U.S. Pat. No. 4,018,642 Pike—The patentee uses microwave energy applied to plywood for curing.

U.S. Pat. No. 4,067,765 Heller et al—The patentees utilize a film of oleaginous substance between plastic elements to be joined by a thermal bond and utilize indirect heating by high frequency alternating magnetic field to achieve the bonding temperature.

Differentiating from the above prior art, the present invention is capable of producing biomedical products such as a balloon attached frangibly to a catheter which can be inserted and the bond dissolves by moisture internally, or where polyurethane strands or cables of different diameters are joined by permanent bond, utilizing permanent hydrogel bond under pressure.

TYPES OF BONDS

Temporary Bonds. A temporary bond can be achieved at atmopsheric pressure by joining the two hydrogel surfaces together through fusing of one hydrogel coated layer to the other hydrogel coating on the abutting piece. The bond takes place only within the hydrogel itself and does not affect the bulk of the pieces to be joined (except in the case of extremely temperature sensitive materials that become molten below 100° C.). Only the bond line receives heat. This is of advantage in circumstances where multicomponent parts of temperature sensitive nature are used. Also, it has the added advantage of preventing possible degradation of the bulk of materials or change of its other surface characteristics. This is an important consideration in cases where properties must remain unchanged, such as when used in the body where tissue reactions could ensue. The resulting bond is as strong as the parent material when kept dry. Since the hydrogels are very hydrophilic, simple immersion in water will cause them to reabsorb water at the bond interface, swelling the joint and separating the surfaces. Such bonds could be of value in designing implantable surgical devices that would rely upon a slow separation of their parts on exposure to body fluids.

Permanent bonds.

By use of a pressure vessel (see FIG. 1) permanent bonds can be achieved. It is well known that when water is heated in a confined vessel under pressure, the boiling point is elevated proportionately. In this invention, these hydrogel-coated surfaces to be bonded are placed in a pressure vessel equipped with a safety relief valve and appropriate fittings for introducing inert gas (such as R.T. $N_2$ gas) under pressure. The vessel is subsequently bombarded with microwave energy which will pass, uninterrupted, through the vessel (if it is non-metallic) or through a non-metallic window or waveguide in the vessel. The temperature of the water in the hydrogel at the bond interface is elevated and by heat transfer, softens and melts the adjacent surface. By regulating the amount of pressure, this temperature can be elevated to whatever temperature is necessary to soften the contacting surfaces. Here, contacting surfaces must be in intimate contact or held together firmly by a suitable clamp to accomplish a bond as strong as the parent materials.

The time and power level of the microwave energy is varied to achieve the appropriate temperature. Once melting has occurred, the two surfaces are bonded and the process can be stopped. Any number of items can be treated at the same time, depending upon the capacity of the vessel.

BRIEF DESCRIPTION OF THE DRAWING

Legend for the FIGURE

1. Microwave window of material transparent to microwave energy (i.e., glass, ceramic, plastic, etc.). The opening is larger than one-half wave length of microwave.
2. Metal vessel
3. Gas inlet with quick disconnect
4. Floating plate of microwave transparent material
5. Thermosensitive material to be bonded (i.e., substrates to be bonded)
6. Hydrogel coating
7. Pressurized inert gas source, such as dry nitrogen
8. Wave guide, metal tube
9. Microwave energy
10. Microwave source (magnetron)
11. Gas pressure regulator with safety pressure relief valve

EXAMPLE 1

A Coating of Polyvinylpyrrolidone-Polyurethane Interpolymer

In this example hydrogel was used as the bonding medium as a coating of polyvinylpyrrolidone-polyurethane interpolymer. The PVP-PU polymer was made by applying a polyisocyanate and a polyurethane in a solvent and then applying a polyvinylpyrrolidone in a solvent to form a polyvinylpyrrolidone-polyurethane interpolymer (i.e., hydrogel).

The ingredients were:

Part 1—Hughson isocyanate polyurethane #7000 and #7200 catalyst. A preparation of 0.3–5 parts (by weight) per hundred of 7200 was added to the 7000 resin. A 1% solution in methyl ethyl ketone (MEK) was made up using the above mixture.

Part 2—4% (by weight) of polyvinylpyrrolidone (K90 molecular weight) solution was prepared by dissolving an ethyl L-lactate. The surface to be coated was cleaned and coated with Part 1 and dried in an oven for 5 min. at 150° F. (65° C.) or air dried overnight. To this coated surface a second layer was added using Part 2 and air dried for approximately 1 hour, followed by curing overnight at room temperature or oven curing at 150° F. (65° C.) for 1 hour.

The coated surfaces were bonded together using microwave as previously described in the specification.

EXAMPLE 2

An Isocyanate and a Polyglycol Combination Reaction

The hydrogel used as the bonding medium was a coating of Hydrogel Prepolymer #10501-21-5 W. R. Grace Company, Columbia, MD (an isocyanate and a polyglycol combination reaction). The hydrogel prepolymer was spread onto the bond line and cured in place by subjecting to moisture. The time of reaction varied from 1 minute to overnight, depending upon the amount of moisture presented to the surface. Once cured, the non-tacky hydrogel was immersed in water for several minutes (faster if temperature is above 75° F.) to imbibe the water. The bond was then achieved by subjecting to microwave energy as previously described in the specification. In particular, the microwave energy utilized was 1.3 KW power consumption via magnitron and the variables to control the power setting was 90 to 625 watts (Sears Industrial Unit 1000 watts) and the time variable was infinite.

We claim:

1. A method of bonding substrates using a hydrogel adhesive selected from one member of the group consisting of an interpolymer of poly(N-vinyl-2-pyrrolidone)/polyurethane and a polyurethane derived from an isocyanate and a polyglycol wherein the hydrogel adhesive is applied to each of the substrates to be joined, the hydrogel surfaces contacted and the assembly so formed thereafter exposed to microwave energy to effect bonding of the substrates, said bonding being carried out at atmospheric pressure and the resulting bond being temporary and frangible by water.

2. A method of bonding substrates using a hydrogel adhesive selected from one member of the group consisting of an interpolymer of poly(N-vinyl-2-pyrrolidone)/polyurethane and a polyurethane derived from an isocyanate and a polyglycol wherein the hydrogel adhesive is applied to each of the substrates to be joined, the hydrogel surfaces contacted and the assembly so formed thereafter exposed to microwave energy to effect bonding of the suustrates, said bonding being carried out at elevated pressure in a pressure vessel and the resulting bond is permanent.

* * * * *